No. 789,665. PATENTED MAY 9, 1905.
W. MARSHALL.
LAWN MOWER.
APPLICATION FILED APR. 15, 1904.

3 SHEETS—SHEET 1.

Witnesses
C. K. Reichenbach
F. C. Jones

Inventor
W. Marshall
By Chandler & Chandlee
Attorneys

No. 789,665. PATENTED MAY 9, 1905.
W. MARSHALL.
LAWN MOWER.
APPLICATION FILED APR. 15, 1904.

3 SHEETS—SHEET 2.

Witnesses
E. K. Reichenbach.
F. C. Jones.

Inventor
W. Marshall.
Chandler & Chandler
Attorneys

No. 789,665. PATENTED MAY 9, 1905.
W. MARSHALL.
LAWN MOWER.
APPLICATION FILED APR. 15, 1904.
3 SHEETS—SHEET 3.
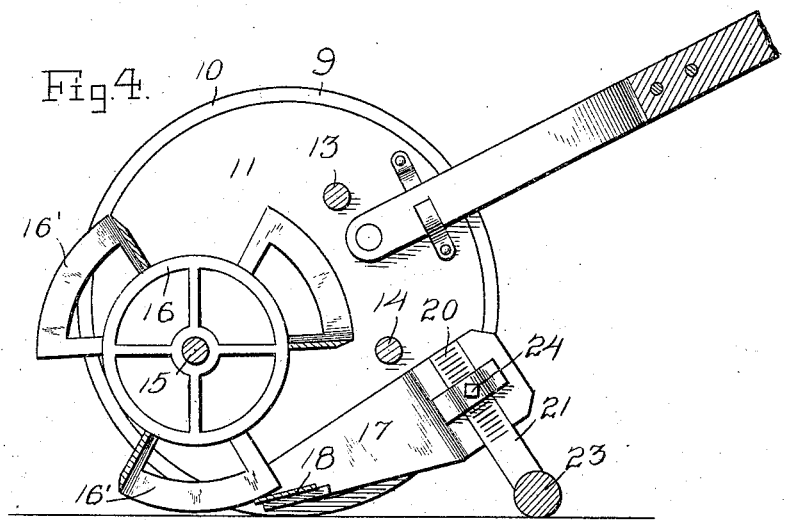
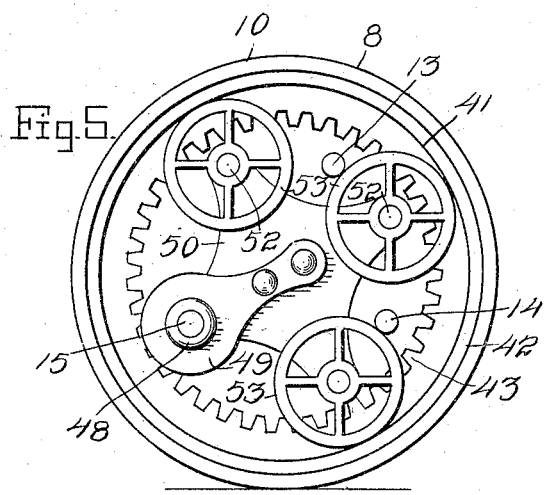
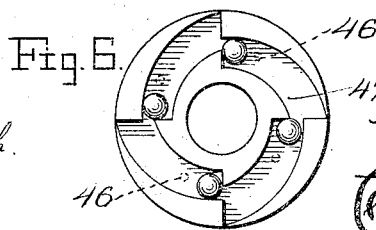
Witnesses
C. K. Reichenbach
J. C. Jones
Inventor
W. Marshall
by
Chandlee & Chandlee
Attorneys No. 789,665. Patented May 9, 1905.

UNITED STATES PATENT OFFICE.

WILLIAM MARSHALL, OF MASSILLON, OHIO.

LAWN-MOWER.

SPECIFICATION forming part of Letters Patent No. 789,665, dated May 9, 1905.

Application filed April 15, 1904. Serial No. 203,303.

*To all whom it may concern:*

Be it known that I, WILLIAM MARSHALL, a citizen of the United States, residing at Massillon, in the county of Stark, State of Ohio, have invented certain new and useful Improvements in Lawn-Mowers; and I do hereby declare the following to be a full, clear, and exact description of the invention, such as will enable others skilled in the art to which it appertains to make and use the same.

This invention relates to mowers, and more particularly to lawn-mowers, and has for its object to provide a machine of this nature which will be so constructed that it may be used in cutting grass growing close to fences, walls, &c., and which will be provided with a novel arrangement of knives.

A further object is to provide a construction of traction-wheels which will insure ease and perfection in the operation of the machine.

Other objects and advantages will be apparent from the following description.

Figure 1:
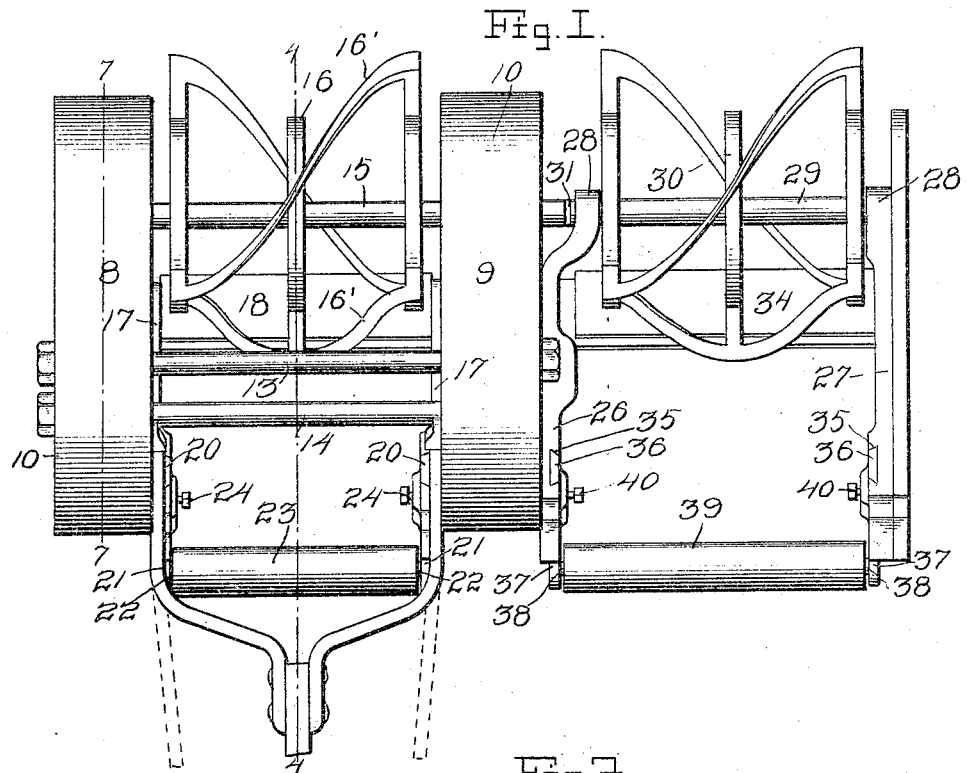
Figure 3:
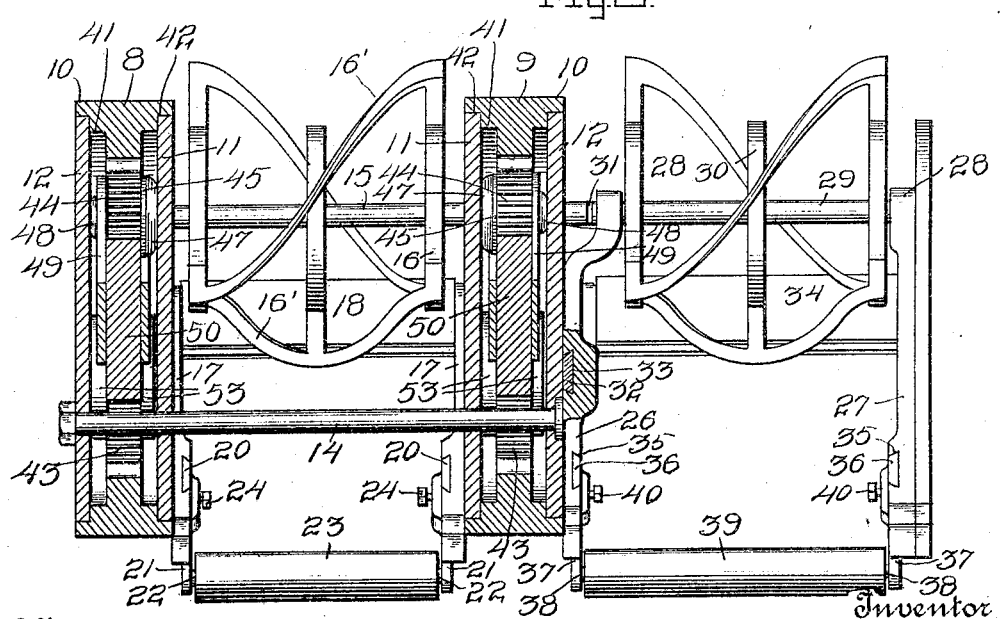
Figure 2:
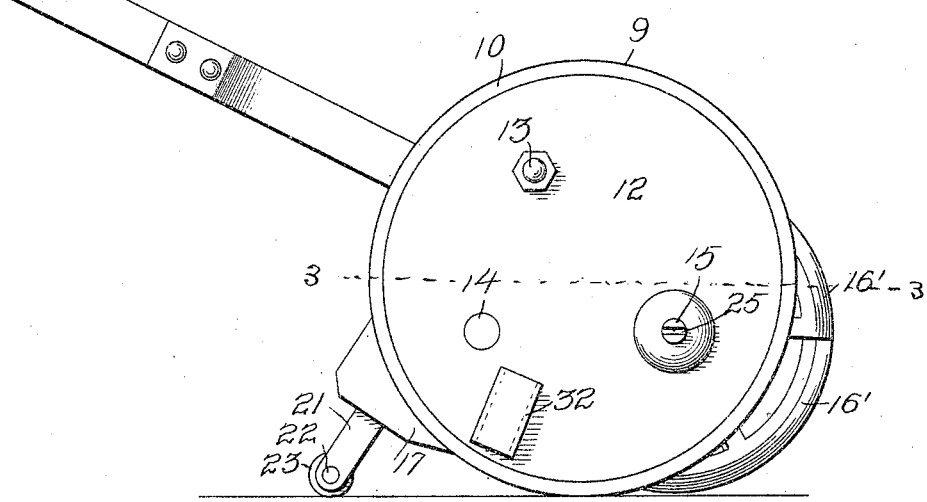
Figure 7:
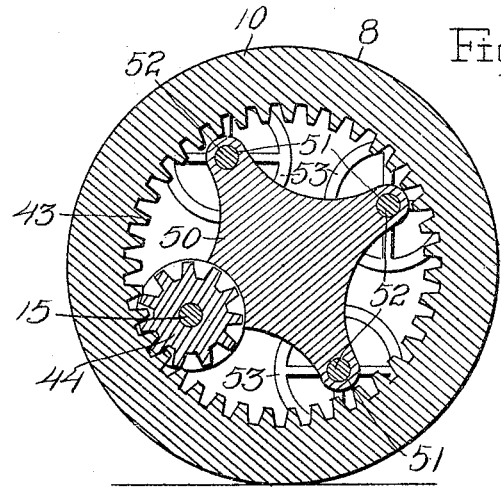

In the drawings forming a portion of this specification, and in which like numerals of reference indicate similar parts in the several views, Figure 1 is a top plan view of the complete mower. Fig. 2 is an end view of the mower with the supplementary cutting attachment removed. Fig. 3 is a section on line 3 3 of Fig. 2. Fig. 4 is a section on line 4 4 of Fig. 1. Fig. 5 is a view of one of the traction-wheels with the outer plate removed. Fig. 6 is a detail view of the clutch mechanism. Fig. 7 is a section on line 7 7 of Fig. 1, showing the interior of the traction-wheel.

Referring now to the drawings, the present invention comprises two traction-wheels 8 and 9, which are of peculiar construction, which will be hereinafter described. Each of the wheels includes a revoluble tread 10, which moves between stationary side disks 11 and 12, the two sets of disks being connected by rods 13 and 14.

Journaled in the disks forwardly of the rods 13 and 14 is a shaft 15, which carries between the two inner disks 11 the knife-wheel 16, and secured to these disks at their lower portions are brackets 17, to which a supplementary blade 18 is attached, which is so positioned that the knives 16' of the knife-wheel coöperate therewith to mow the grass. At the rearward extremities of the brackets 17 they are provided with dovetail openings, with which are slidably engaged the shanks 20 of brackets 21, in which are revolubly mounted the trunnions 22 of a ground-roller 23, and the brackets 17 are provided with set-screws 24, which may be operated to clamp the shanks 20 at different points of their sliding movement. The ground-roller may thus be adjusted to vary the pitch of the blade 18 with respect to the ground.

The shaft 15 is geared to the treads 10 in a manner which will be hereinafter described and receives its motion therefrom, this shaft extending beyond the outer disk 12 of the wheel 9 and being provided with a slot 25 in its end.

A supplementary cutting mechanism is attached to the mechanism just described and consists of end portions 26 and 27, having bearings 28 therein, in which there is journaled a shaft 29, carrying a knife-wheel 30, and this shaft has a tongue 31 projecting from one end, which when the attachment is in place lies in the slot 25 of the shaft 15. The supplementary mechanism is attached to the mower proper by means of a dovetail block 32, which projects from the outer face of the disk 12 of the wheel 9 and which is of a size to engage a dovetail slot 33 in the end portion 26 of the attachment. Attached to the forward ends of the end portions 26 and 27 is a blade 34, which corresponds to the blade 18, and at their rearward ends these end portions are provided with dovetail passages 35, with which are engaged the shanks 36 of brackets 37, which have journaled therein the trunnions 38 of a ground-roller 39. This arrangement, as will be observed, corresponds to the arrangement of the ground-roller in the mower proper, and set-screws 40 are provided by means of which the roller may be positioned to adjust the knife 34 as desired. It will thus be seen that the attachment, so far as the ground-roller, knife-wheel, and supplementary blade are concerned, is identical with the mower proper, but that the outer end of the shaft 29 carries no wheel, so that this end of the shaft may be moved close to fences, walls, &c., and the grass at these points may thus be evenly cut.

The traction-wheels above mentioned are identical in interior construction, so that a description of one will suffice for both. As stated, these wheels include a tread 10, which is in the form of a hollow cylinder having an interior peripheral flange 41, which is spaced from the ends of the cylinder to form rabbets 42, and it is in these rabbets that the circumferences of the disks 11 and 12 are received. Projecting centrally from the peripheral flange 41 is an internal gear 43, which meshes with a gear 44, revolubly mounted upon the shaft 15 between the two disks, and which carries the disk 45 and pins 46 of a ball-clutch 47, which is mounted upon the shaft 15. Rotation of the gear 43 with the tread 10 thus causes rotation of the gear 44, rotation of this gear in one direction causing rotation also of the shaft 15 and knife-wheel 16, while free movement of the two gears in the opposite direction is permitted by the clutch 47. It will of course be understood that the shaft 15 is rotated during the forward movement of the machine and remains stationary during the rearward movement thereof, as is customary in lawn-mowers.

The shaft 15 is engaged with bearings 48 in the ends of plates 49, which are secured at their opposite ends to a plate 50, having openings 51 therein, which are arranged in the form of a triangle, and engaged with these openings are shafts 52, which project at opposite sides of the plate 50 and which have journaled upon their ends wheels 53, which are so disposed that their peripheries engage the face of the flange 41. The three sets of the wheels 53 and the gear 44 are arranged in the form of a square, so that the tread 10 is supported at four points, which insures an even bearing-surface.

As shown, the rods 13 and 14 extend through the disks 12 and are secured by bolts which bear against the outer faces thereof.

It will be apparent from the above description that when the machine is moved forwardly over the ground the treads 10 are revolved, and this movement is communicated to the shafts 15 and 29, which revolve the knives 16 and 30, which coöperate with the blades 18 and 34 to cut the grass, which is brought between the knives of the wheels and the blades. It will of course be understood that the machine may be used either with or without the supplementary cutting attachment and that a suitable handle is provided.

What is claimed is—

1. The combination with a lawn-mower including a frame, a revolubly-mounted shaft, and means for revolving the shaft, said shaft extending outwardly of the frame at one end and having a slot formed in said end, said frame having a dovetail block secured thereto, of a supplementary cutting attachment comprising a frame having a dovetail slot therein with which the block is slidably engaged, a shaft revolubly mounted in the frame of the attachment and having a reduced portion removably engaged in the slot of the first-named shaft, and cutting mechanism carried by the shaft of the attachment, said reduced portion being arranged for movement into and out of the slot of the first-mentioned shaft when the attachment is moved to bring the dovetail projection into and out of the dovetail slot.

2. The combination with a lawn-mower, including a frame, a revolubly-mounted shaft, and means for revolving the shaft, said frame having a dovetail block secured thereto, of a supplementary cutting attachment removably attached thereto, said attachment comprising a frame having a dovetail slot therein with which the block is engaged, a shaft revolubly mounted in the frame and removably connected to the first-named shaft, and cutting mechanism carried by the shaft.

3. A lawn-mower comprising a frame, a shaft revolubly mounted in the frame, cutting mechanism carried by the shaft plates engaged with the shaft and in which the latter is revolubly mounted, said plates including a plurality of radiating fingers, said plates having recesses therein through which the shaft passes, gears mounted upon the shaft, one of said gears lying in each of the recesses, and extending outwardly beyond the adjacent edges of the plates, clutch connections between the shaft and the gears for free rotation of the shaft in one direction, cylinders having internal gears in mesh with the first-named gears and inclosing the plates, said internal gears of the cylinders being of less width than the cylinders, and revolubly-mounted wheels carried by the fingers of the plates at opposite sides thereof, said wheels lying in engagement with the inner faces of the cylinders at the sides of the internal gears, said cylinders being arranged for rotation to revolve the first-named gears and the shaft.

In testimony whereof I affix my signature in presence of two witnesses.

WILLIAM MARSHALL.

Witnesses:
F. C. REED,
BERNARD BELL.